(12) United States Patent
Aburai

(10) Patent No.: US 11,007,888 B2
(45) Date of Patent: May 18, 2021

(54) LOCKING DEVICE FOR VEHICLE

(71) Applicant: Toyota Jidosha Kabushiki Kaisha, Toyota (JP)

(72) Inventor: Noriaki Aburai, Toyota (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 146 days.

(21) Appl. No.: 16/167,936

(22) Filed: Oct. 23, 2018

(65) Prior Publication Data

US 2019/0143824 A1 May 16, 2019

(30) Foreign Application Priority Data

Nov. 14, 2017 (JP) .............................. JP2017-218831

(51) Int. Cl.
| | |
|---|---|
| *B60L 53/16* | (2019.01) |
| *B60L 53/30* | (2019.01) |
| *H01R 13/639* | (2006.01) |
| *H01R 13/447* | (2006.01) |

(52) U.S. Cl.
CPC .............. *B60L 53/16* (2019.02); *B60L 53/30* (2019.02); *B60L 2270/32* (2013.01); *H01R 13/447* (2013.01); *H01R 13/6397* (2013.01); *H01R 2201/26* (2013.01)

(58) Field of Classification Search
CPC .................................. B60L 53/16; B60L 53/30
See application file for complete search history.

(56) References Cited

U.S. PATENT DOCUMENTS

| | | | | |
|---|---|---|---|---|
| 5,887,466 | A * | 3/1999 | Yoshizawa | .......... B60R 25/1001 292/201 |
| 9,444,187 | B2 * | 9/2016 | Kojima | ................ H01R 13/639 |
| 2009/0082916 | A1 | 3/2009 | Tanaka | |
| 2012/0234061 | A1 | 9/2012 | Inoue et al. | |
| 2016/0028187 | A1 | 1/2016 | Kojima et al. | |
| 2017/0197515 | A1 | 7/2017 | Southey et al. | |

FOREIGN PATENT DOCUMENTS

| | | |
|---|---|---|
| CN | 105121217 A | 12/2015 |
| CN | 106961041 A | 7/2017 |
| JP | 2009-081917 A | 4/2009 |
| JP | 2012-212647 A | 11/2012 |

\* cited by examiner

*Primary Examiner* — Hai L Nguyen
(74) *Attorney, Agent, or Firm* — Dinsmore & Shohl LLP

(57) ABSTRACT

A vehicle include: an AC inlet configured to be connectable to an AC connector; a DC inlet configured to be connectable to a DC connector; a first actuator configured to perform a locking operation and an unlocking operation for an AC lid configured to cover the AC inlet; a second actuator configured to perform a locking operation and an unlocking operation for a DC lid configured to cover the DC inlet; a first electric power line; a second electric power line; a lock relay connected to one end of the first electric power line; and an unlock relay connected to one end of the second electric power line. The first actuator and the second actuator are connected in parallel with each other between the other end of the first electric power line and the other end of the second electric power line.

3 Claims, 4 Drawing Sheets

LOCKING DEVICE FOR VEHICLE

CROSS-REFERENCE TO RELATED APPLICATIONS

This nonprovisional application claims priority to Japanese Patent Application No. 2017-218831 filed on Nov. 14, 2017 with the Japan Patent Office, the entire contents of which are hereby incorporated by reference.

BACKGROUND

Field

The present disclosure relates to a locking device for a vehicle, and particularly to a device for locking a charging lid configured to cover an inlet through which electric power is received from outside the vehicle.

Description of the Background Art

Japanese Patent Laying-Open No. 2012-212647 discloses a vehicle configured to be capable of receiving electric power through a power feeding connector external to the vehicle. This vehicle include: a door lock actuator configured to perform a locking operation and an unlocking operation for a door for vehicle occupant and a power feeding connector lock actuator configured to perform a locking operation and an unlocking operation for the power feeding connector. The door lock actuator and the power feeding connector lock actuator are connected in parallel with a lock relay and an unlock relay. Thereby, the locking operation and the unlocking operation for the power feeding connector can be performed cooperatively with the locking operation and the unlocking operation, respectively, for the door for vehicle occupant.

SUMMARY

In Japanese Patent Laying-Open No. 2012-212647, the locking operation and the unlocking operation for the power feeding connector are performed cooperatively with the locking operation and the unlocking operation, respectively, for the door for vehicle occupant.

However, in general, a vehicle configured to be capable of receiving electric power through the power feeding connector is provided with a charging lid configured to cover a power receiving inlet. Furthermore, there is also a conceivable vehicle including: an alternating-current (AC) lid configured to cover an AC power receiving inlet and a direct-current (DC) lid configured to cover a DC power receiving inlet, in which the AC lid and the DC lid are separately provided as charging lids. Japanese Patent Laying-Open No. 2012-212647 fails to disclose how to perform the locking operation and the unlocking operation for each of these two charging lids (the AC lid and the DC lid).

The present disclosure has been made to solve the above-described problems. An object of the present disclosure is to allow the locking operation and the unlocking operation for the AC lid to be performed cooperatively with the locking operation and the unlocking operation, respectively, for the DC lid.

(1) A locking device according to the present disclosure is provided as a locking device for a vehicle, the vehicle including: an AC inlet connectable to an AC, connector external to the vehicle; and a DC inlet connectable to a DC connector external to the vehicle. The locking device includes: a first electric actuator configured to perform a locking operation and an unlocking operation for an AC lid configured to cover the AC inlet; a second electric actuator configured to perform a locking operation and an unlocking operation for a DC lid configured to cover the DC inlet; a first electric power line; a second electric power line; a lock relay connected to one end of the first electric power line; and an unlock relay connected to one end of the second electric power line. The first electric actuator and the second electric actuator are connected in parallel with each other between the other end of the first electric power line and the other end of the second electric power line.

According to the above-described device, the first electric actuator and the second electric actuator are connected in parallel with each other between the first electric power line to which the lock relay is connected and the second electric power line to which the unlock relay is connected. Accordingly, one lock relay is shared in common between the first electric actuator and the second electric actuator. Thereby, the locking operation for the AC lid and the locking operation for the DC lid can be performed at a cooperative timing. Furthermore, one unlock relay is shared in common between the first electric actuator and the second electric actuator. Thereby, the unlocking operation for the AC lid and the unlocking operation for the DC lid can also be performed at a cooperative timing.

(2) in an embodiment, the locking device further includes a third electric actuator configured to perform a locking operation and an unlocking operation for the AC connector or the DC connector. The third electric actuator is connected in parallel with the first electric actuator and the second electric actuator between the other end of the first electric power line and the other end of the second electric power line.

According to the above-described embodiment, the first, second and third electric actuators are connected in parallel between the first electric power line to which the lock relay is connected and the second electric power line to which the unlock relay is connected. Accordingly, one lock relay is shared in common among the first, second and third electric actuators. Thereby, the locking operation for the power feeding connector (the AC connector or the DC connector) can be performed at a cooperative timing with the locking operations for the AC lid and the DC lid. Furthermore, one unlock relay is shared in common among the first, second and third electric actuators. Thereby, the unlocking operation for the power feeding connector (the AC connector or the DC connector) can be performed at a cooperative timing with the unlocking operations for the AC lid and the DC lid.

(3) in an embodiment, the locking device includes: a third electric actuator configured to perform a locking operation and an unlocking operation for the AC connector or the DC connector; a third electric power line; and another lock relay connected to one end of the third electric power line. The third electric actuator is connected between the other end of the third electric power line and the second electric power line.

According to the above-described embodiment, one unlock relay shared in common between the first and second electric actuators is also shared in common with the third electric actuator. Thereby, the unlocking operation for the power feeding connector (the AC connector or the DC connector) can be performed at a cooperative timing with the unlocking operations for the AC lid and the DC lid. Furthermore, the lock relay of the third electric actuator is provided separately from the unlock relay shared in common between the first electric actuator and the second electric actuator. Accordingly, it becomes possible to suppress that the timing; of the locking operation for the power feeding connector (the AC connector or the DC connector) is limited to the timings of the locking operations for the AC lid and the DC lid.

The foregoing and other objects, features, aspects and advantages of the present disclosure will become more apparent from the following detailed description of the present disclosure when taken in conjunction with the accompanying drawings.

DESCRIPTION OF THE EMBODIMENTS

Figure 1:
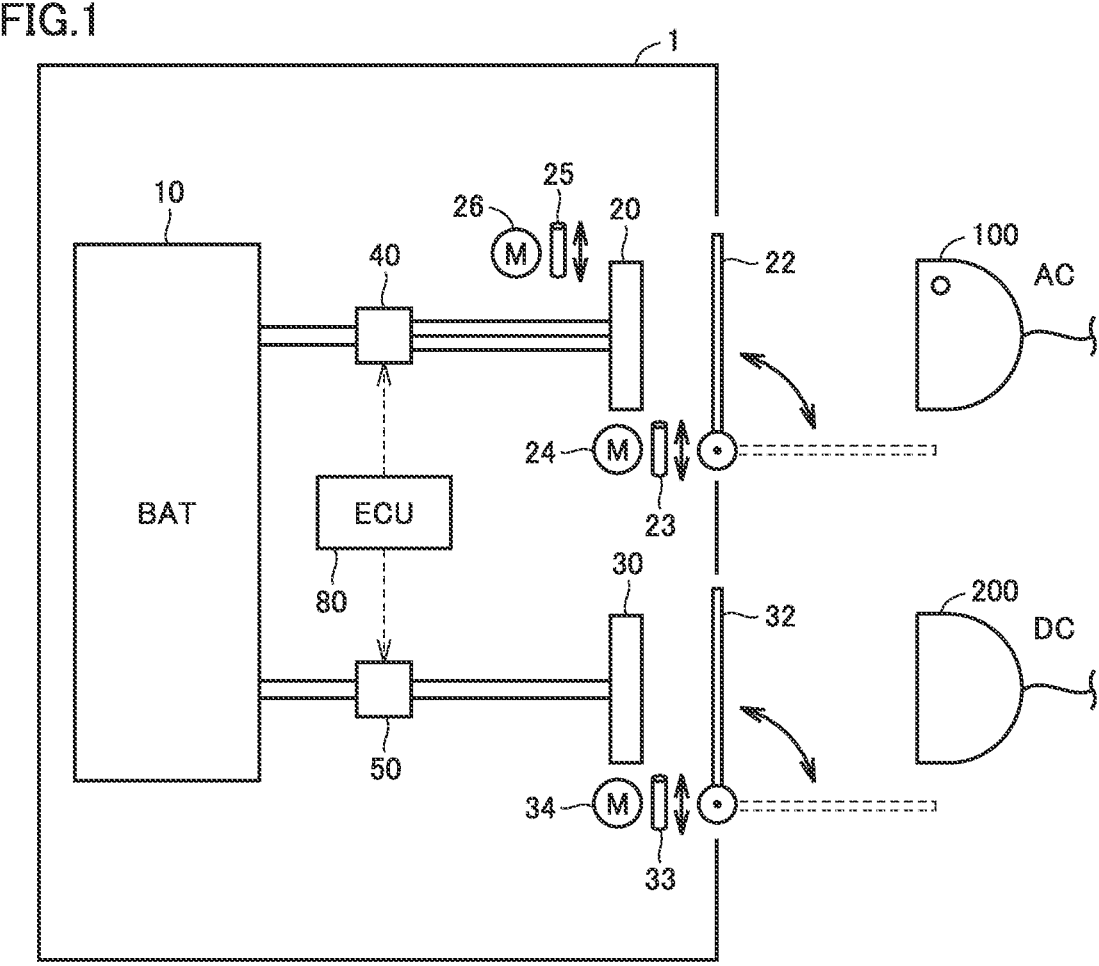
FIG. 1 is a diagram showing the entire configuration of a vehicle.

Embodiments of the present disclosure will be hereinafter described in detail with reference to the accompanying drawings, in which the same or corresponding components are designated by the same reference characters, and description thereof will not be repeated.

<Entire Configuration>

FIG. 1 is a diagram showing the entire configuration of a vehicle 1 including a locking device according to the present embodiment. Vehicle 1 includes a power storage device 10, an AC (alternating-current) inlet 20, an AC lid 22, a DC (direct-current) inlet 30, a DC lid 32, a power conversion device 40, a voltage conversion device 50, and an electronic control unit (ECU) 80.

Power storage device 10 is configured to be chargeable and dischargeable. Power storage device 10 is configured to include a secondary battery such as a nickel-metal hydride battery and a lithium ion battery, for example.

Vehicle 1 is an electrically powered vehicle (a hybrid vehicle, an electric vehicle and the like) capable of traveling using the electric power stored in power storage device 10. Vehicle 1 is configured such that it can receive electric power from at least one of: an AC connector 100 connected to an AC power supply external to the vehicle; and a DC connector 200 connected to a DC power supply external to the vehicle.

AC inlet 20 is configured to be connectable to AC connector 100. AC lid 22 is configured such that it cart be opened and closed relative to AC inlet 20. In the state where AC lid 22 is opened and AC connector 100 is connected to AC inlet 20, in vehicle 1, power storage device 10 can be charged using AC power supplied from AC connector 100.

DC inlet 30 is configured to be connectable to DC connector 200. DC lid 32 is provided separately from AC lid 22 and configured such that it can be opened and closed relative to DC inlet 30. In the state where DC lid 32 is opened and DC connector 200 is connected to DC inlet 30, in vehicle 1, power storage device 10 can be charged using DC power supplied from DC connector 200.

Power conversion device 40 is connected between AC inlet 20 and power storage device 10. Power conversion device 40 is operated by a control signal from ECU 80 to convert the AC power received by AC inlet 20 from AC connector 100 into electric power with which power storage device 10 can be charged. Then, power conversion device 40 supplies the converted electric power to power storage device 10. Thereby, power storage device 10 is charged using the AC power supplied from AC connector 100.

Voltage conversion device 50 connected between DC inlet 30 and power storage device 10. Voltage conversion device 50 is operated by a control signal from ECU 80 to convert the voltage of the DC power received by DC inlet 30 from DC connector 200 into a voltage with which power storage device 10 can be charged. Then, voltage conversion device 50 supplies the converted voltage to power storage device 10. Thereby, power storage device 10 is charged using the DC power supplied from DC connector 200. When DC connector 200 outputs a voltage with which power storage device 10 can be charged, voltage conversion device 50 does not have to be provided.

Furthermore, vehicle 1 includes an AC lid lock pin 23 and a first actuator 24 that serve as a locking device for AC lid 22. AC lid lock pin 23 serves as a member for bringing AC lid 22 into a locked state so as to be fixed in the Closed state, and for bringing AC lid 22 into an unlocked state so as to be openable and closeable. AC lid lock pin 23 is configured to be movable in the pin axis direction.

First actuator 24 serves as an electric actuator (motor) for moving AC lid lock pin 23 in the pin axis direction. When a current flows through first actuator 24 in one direction (in a lock direction), first actuator 24 performs a locking operation to move AC lid lock pin 23 to a predetermined lock position. Thereby, AC lid 22 is brought into a locked state. When a current flows through first actuator 24 in the direction opposite to the lock direction (in an unlock direction), first actuator 24 performs an unlocking operation to move AC lid lock pin 23 to a predetermined unlock position. Thereby, AC lid 22 is brought into an unlocked state.

Furthermore, vehicle 1 includes a DC lid lock pin 33 and a second actuator 34 that serve as a locking device for DC lid 32. DC lid lock pin 33 serves as a member for bringing DC lid 32 into a locked state so as to be fixed in the closed state and or bringing DC lid 32 into an unlocked state so as to be openable and closeable. DC lid lock pin 33 is configured to be movable in the pin axis direction.

Second actuator 34 serves as an electric actuator (motor) for moving DC lid lock pin 33 in the pin axis direction. When a current flows through second actuator 34 in one direction (in a lock direction), second actuator 34 performs the locking operation to move. DC lid lock pin 33 to a predetermined lock position. Thereby, DC lid 32 is brought into a locked state. When a current flows through second actuator 34 in the direction opposite to the lock direction (in an unlock direction), second actuator 34 performs the unlocking operation to move DC lid lock pin 33 to a predetermined unlock position. Thereby, DC lid 32 is brought into an unlocked state.

Furthermore, vehicle 1 includes an AC connector lock pin 25 and a third actuator 26 that serve as a locking device for AC connector 100. AC connector lock pin 25 serves as a member for bringing AC connector 100 into a locked state so as to be fixed to AC inlet 20, and for bringing AC connector 100 into an unlocked state so as to be removable from AC inlet 20. AC connector lock pin 25 is configured to be movable in the pin axis direction.

Third actuator 26 serves as an electric actuator (motor) for moving AC connector lock pin 25 in the pin axis direction. When a current flows through third actuator 26 in one direction (in a lock direction), third actuator 26 performs the locking operation to move AC connector lock pin 25 to a predetermined lock position. Thereby, AC connector 100 is brought into a locked state. When a current flows through third actuator 26 in the direction opposite to the lock direction (in an unlock direction), third actuator 26 performs the unlocking operation to move AC connector lock pin 25 to a predetermined unlock position. Thereby, AC connector 100 is brought into an unlocked state.

<Circuit Configuration in Locking Device>

Figure 2:
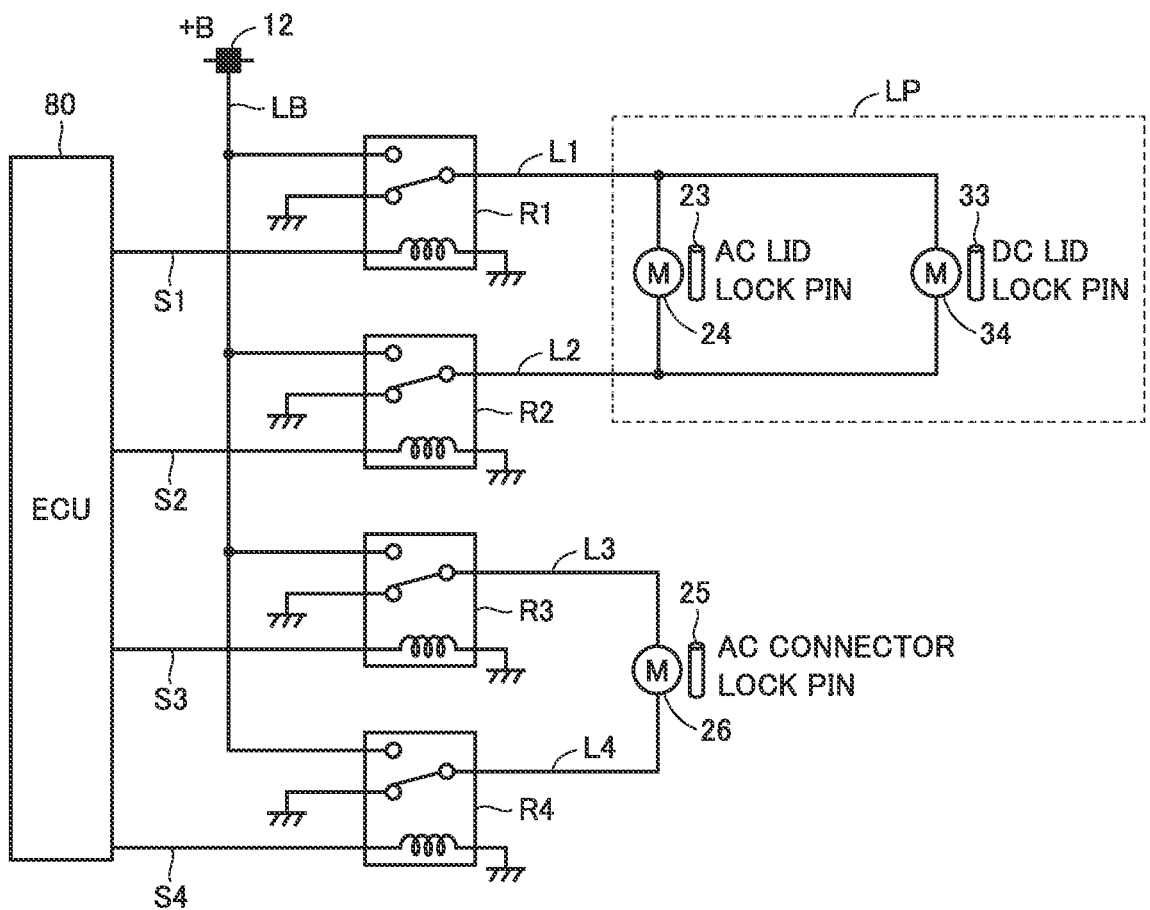
FIG. 2 is a diagram (first) showing an example of the configuration of a circuit in a locking device.

FIG. 2 is a diagram showing an example of the configuration of a circuit 2 in the locking device including first actuator 24, second actuator 34 and third actuator 26, which are described above.

In addition to the above-described first actuator 24, second actuator 34 and third actuator 26, this circuit 2 includes: a power supply line LB through which electric power is supplied from power supply 12; a first electric power line L1; a lock relay R1 connected to one end of first electric power line L1; a second electric power line L2; an unlock relay R2 connected to one end of second electric power line L2; and a parallel wiring line LP.

According to a command signal transmitted from ECU 80 through a signal line S1, lock relay R1 is configured to be capable of switching connection in such a manner that one end of first electric power line L1 is connected to power supply line LB or a ground (a portion with a reference potential).

According to a command signal transmitted from ECU 80 through a signal line S2, unlock relay R2 is configured to be capable of switching connection in such a manner that one end of second electric power line L2 is connected to power supply line LB or a ground.

Lock relay R1 and unlock relay R2 are controlled cooperatively with each other such that one of first electric power line L1 and second electric power line L2 is connected to power supply line LB while the other of first electric power line L1 and second electric power line L2 is connected to a ground.

Parallel wiring line LP is connected between the other end of first electric power line L1 and the other end of second electric power line L2, and also configured to connect first actuator 24 and second actuator 34 in parallel with each other.

In the state where lock relay R1 connects first electric power line L1 and power supply line LB, a current flows from first electric power line L1 through first actuator 24 and second actuator 34 in the lock direction. Thereby, the locking operation for AC lid lock pin 23 and the locking operation for DC lid lock pin 33 are cooperatively performed. On the other hand, in the state where unlock relay R2 connects second electric power line L2 and power supply line LB, a current flows from second electric power line L2 through first actuator 24 and second actuator 34 in the unlock direction (in the direction opposite to the lock direction). Thereby, the unlocking operation for AC lid lock pin 23 and the unlocking operation for DC lid lock pin 33 are cooperatively performed.

Furthermore circuit 2 includes a third electric power line L3, a lock relay R3 connected to one end of third electric power line L3, a fourth electric power line L4, and an unlock relay R4 connected to one end of fourth electric power line L4.

According to a command signal transmitted from ECU 80 through a signal line S3, unlock relay R3 is configured to be capable of switching connection in such a manner that one end of third electric power line L3 is connected to power supply line LB or a ground.

According to a command signal transmitted from ECU 80 through a signal line S4, unlock relay R4 is configured to be capable of switching connection in such a manner that one end of fourth electric power line L4 is connected to power supply line LB or a ground.

Lock relay R3 and unlock relay R4 are controlled cooperatively with each other such that one of third electric power line L3 and fourth electric power line L4 is connected to power supply line LB while the other of third electric power line L3 and fourth electric power line L4 is connected to a ground.

Third actuator 26 is connected between the other end of third electric power line L3 and the other end of fourth electric power line L4. In the state where lock relay R3 connects third electric power line L3 and power supply line LB, a current flows from third electric power line L3 through third actuator 26 in the lock direction, so that the locking operation for AC connector lock pin 25 is performed. On the other hand, in the state where unlock relay R4 connects fourth electric power line L4 and power supply line LB a current flows from fourth electric power line L4 through third actuator 26 in the unlock direction (in the direction opposite to the lock direction), so that the unlocking operation for AC connector lock pin 25 is performed.

As described above, vehicle 1 in the present embodiment includes AC lid 22 and DC lid 32 that are separately provided. Also vehicle 1 includes: first actuator 24 configured to perform the locking operation and the unlocking operation for AC lid 22; and second actuator 34 configured to perform the locking operation and the unlocking operation for DC lid 32.

Then, first actuator 24 and second actuator 34 are connected in parallel with each other between first electric power line L1 to which lock relay R1 is connected and second electric power line L2 to which unlock relay R2 is connected. Accordingly, one lock relay R1 can be shared in common between first actuator 24 and second actuator 34. Thereby, the locking operation for first actuator 24 and the locking operation for second (actuator 34 can be performed at a cooperative timing. Also, the number of lock relays can be reduced by one as compared with the case where one lock relay is provided for each of two actuators. Furthermore, one unlock relay R2 can be shared in common between first actuator 24 and second actuator 34. Thereby, the unlocking operation for first actuator 24 and the unlocking operation for second actuator 34 can be performed at a cooperative dining. Also, the number of unlock relays can be reduced by one as compared with the case where one unlock relay is provided for each of two actuators.

Furthermore, in the present embodiment, third actuator 26 configured to perform the locking operation and the unlocking operation for AC connector 100 is provided with dedicated lock relay R3 and unlock relay R4, separately from lock relay R1 and unlock relay R2 described above. Thus, the timing of the locking operation and the timing of unlocking operation for AC connector 100 can be arbitrarily set without being limited, respectively, to the timing of the locking operation and the timing of the unlocking operation for each of AC lid 22 and DC lid 32.

<First Modification>

The above embodiment has been described with reference to an example in which third actuator 26 configured to perform the locking operation and the unlocking operation for AC connector 100 is provided with dedicated lock relay R3 and unlock relay R4, separately from lock relay R1 and unlock relay R2.

However, lock relay R1 and unlock relay. R2 may also be shared in common with third actuator 26.

Figure 3:
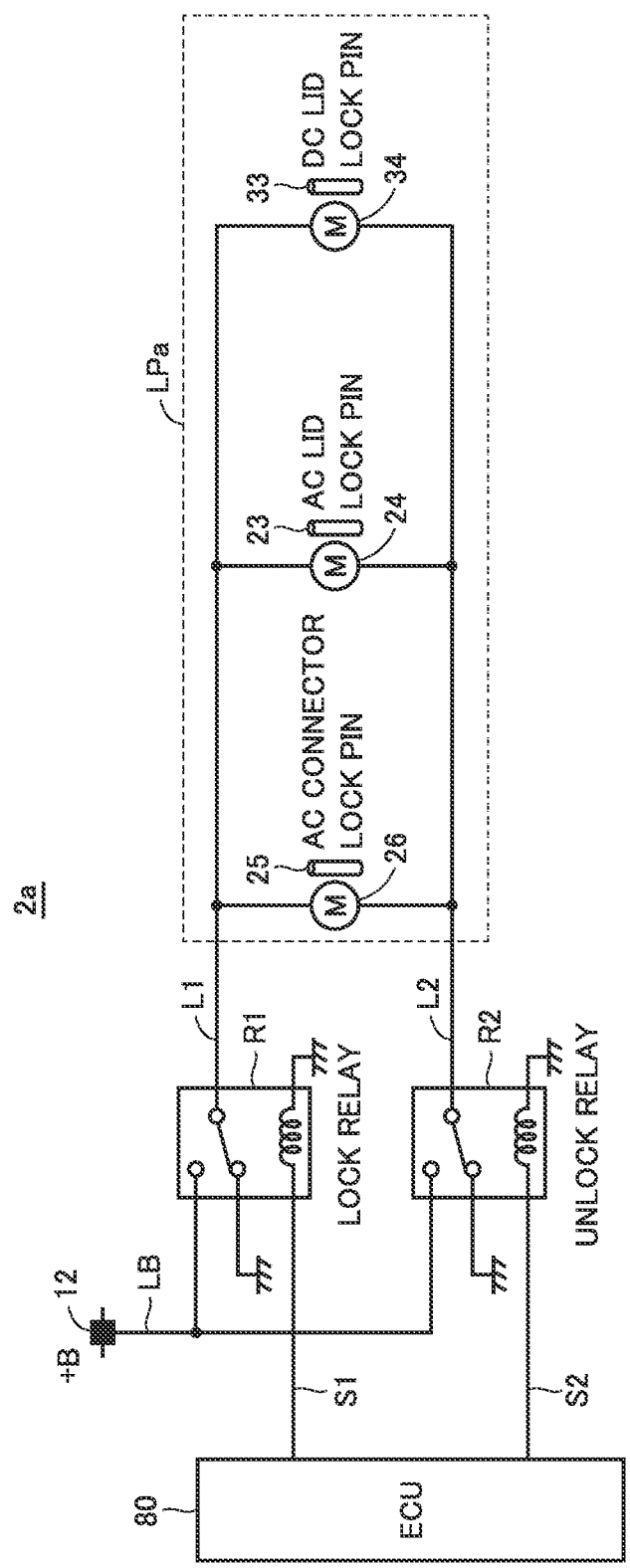
FIG. 3 is a diagram (second) showing an example of the configuration of the circuit in the locking device.

FIG. 3 is a diagram showing an example of the configuration of a circuit 2a in a locking device according to the present first modification. Circuit 2a shown in FIG. 3 is different from circuit 2 shown in the above-mentioned FIG. 2 in that third electric power line L3, fourth electric power line L4, lock relay R3, unlock relay R4, and signal lines S3 and S4 are not provided, and also that parallel wiring line LP is replaced with a parallel wiring line LPa. Since other configurations are the same as those shown in FIG. 2, the detailed description thereof will not be repeated.

Parallel wiring line LPa is connected between the other end of first electric power line L1 and the other end of second electric power line L2, and configured to connect first actuator 24, second actuator 34 and third actuator 26 in parallel with one another.

According to the configuration as described above, one lock relay R1 can be shared in common among first actuator 24, second actuator 34 and third actuator 26. Thereby, the locking operations for the first actuator 24, second actuator 34 and third actuator 26 can be performed at a cooperative timing. Also, the number of lock relays can be reduced by two as compared with the case where one lock relay is provided for each of three actuators. Furthermore, one unlock relay R2 can be shared in common among first actuator 24, second actuator 34 and third actuator 26. Thereby, the unlocking; operations for first actuator 24, second actuator 34 and third actuator 26 can be performed at a cooperative timing. Also, the number of unlock relays can be reduced by two as compared with the case where one unlock relay is provided for each of three actuators.

<Second Modification>

The above embodiment has been described with reference to an example in which third actuator 26 configured to perform the locking operation and the unlocking operation for AC connector 100 is provided with dedicated lock relay R3 and unlock relay R4, separately from lock relay R1 and unlock relay R2.

In contrast, lock relay R3 may be provided for exclusive use of third actuator 26 while unlock relay R2 shared in common between first actuator 24 and second actuator 34 may also be shared in common with third actuator 26.

Figure 4:
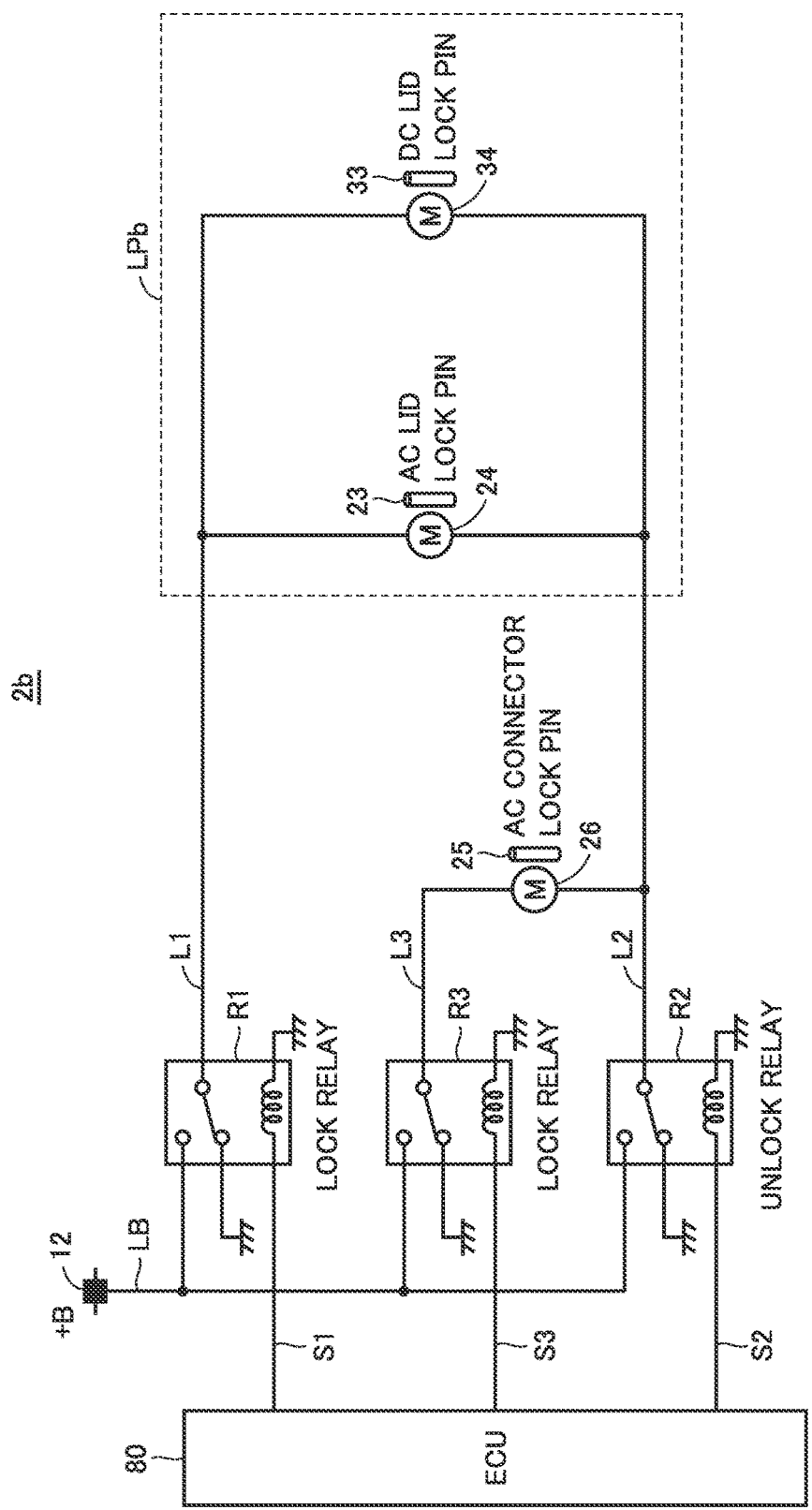
FIG. 4 is a diagram (third) showing an example of the configuration of the circuit in the locking device.

FIG. 4 is a diagram showing an example of the configuration of a circuit 2b in a locking device according to the present second modification. Circuit 2b shown in FIG. 4 is different from circuit 2 shown in the above-mentioned FIG. 2 in that fourth electric power line L4, unlock relay R4 and signal line S4 are not provided and that the portion to which third actuator 26 is connected is changed. Since other configurations are the same as those shown in FIG. 2, the detailed description thereof will not be repeated.

Third actuator 26 is connected between the other end of third electric power line L3 and second electric power line L2.

According to the configuration as described above, unlock relay R2 shared in common between first actuator 24 and second actuator 34 is also shared in common with third actuator 26. Thereby, the unlocking operations for first actuator 24, second actuator 34 and third actuator 26 can be performed at a cooperative timing. Also, the number of unlock relays can be reduced by two as compared with the case where one unlock relay is provided for each of three actuators.

Furthermore, third actuator 26 is provided with dedicated lock relay R3 separately from unlock relay R2 shared in common between other first actuator 24 and second actuator 34. Accordingly, it becomes possible to suppress that the timing of the locking operation for AC connector 100 is limited to the timings of the locking operations for AC lid 22 and DC lid 32.

<Third Modification>

The above embodiment has been described with reference to an example in which a locking device (AC connector lock pin 25 and third actuator 26) for AC connector 100 is provided.

However, a locking device (a DC connector lock pin and an electric actuator for the DC connector lock pin) for DC connector 200 may be provided. In this case, in the circuit illustrated in each of the embodiment and the first and second modifications as described above, third actuator 26 for locking AC connector 100 may be replaced with an electric actuator for locking DC connector 200.

Although the present disclosure has been described and illustrated in detail, it is clearly understood that the same is by way of illustration and example only and is not to be taken by way of limitation, the scope of the present disclosure being interpreted by the terms of the appended claims.

What is claimed is:

1. A locking device for a vehicle, the vehicle including an AC inlet connectable to an AC connector external to the vehicle, and a DC inlet connectable to a DC connector external to the vehicle, the locking device comprising:
    a first electric actuator configured to perform a locking operation and an unlocking operation for an AC lid configured to cover the AC inlet;
    a second electric actuator configured to perform a locking operation and an unlocking operation for a DC lid configured to cover the DC inlet;
    a first electric power line;
    a second electric power line;
    a lock relay connected to one end of the first electric power line; and
    an unlock relay connected to one end of the second electric power line,
    the first electric actuator and the second electric actuator being connected in parallel with each other between the other end of the first electric power line and the other end of the second electric power line.

2. The locking device for a vehicle according to claim 1, further comprising a third electric actuator configured to perform a locking operation and an unlocking operation for the AC connector or the DC connector, wherein
    the third electric actuator is connected in parallel with the first electric actuator and the second electric actuator between the other end of the first electric power line and the other end of the second electric power line.

3. The locking device for a vehicle according to claim 1, further comprising:
    a third electric actuator configured to perform a locking operation and an unlocking operation for the AC connector or the DC connector;
    a third electric power line; and
    another lock relay connected to one end of the third electric power line, wherein
    the third electric actuator is connected between the other end of the third electric power line and the second electric power line.

* * * * *

UNITED STATES PATENT AND TRADEMARK OFFICE
CERTIFICATE OF CORRECTION

Page 1 of 1

PATENT NO. : 11,007,888 B2
APPLICATION NO. : 16/167936
DATED : May 18, 2021
INVENTOR(S) : Noriaki Aburai It is certified that error appears in the above-identified patent and that said Letters Patent is hereby corrected as shown below:

In the Specification

In Column 1, Line(s) 65, after "AC", delete ",".

In Column 2, Line(s) 50, delete "in" and insert --In--, therefor.

In Column 3, Line(s) 51, delete "cart" and insert --can--, therefor.

In Column 4, Line(s) 5, after "50", insert --is--.

In Column 4, Line(s) 20, delete "Closed" and insert --closed--, therefor.

In Column 4, Line(s) 46, after "move", delete ".".

In Column 6, Line(s) 19, after "LB", insert --,--.

In Column 6, Line(s) 38, before "actuator", delete "(".

In Column 7, Line(s) 26, after "unlocking", delete ";".

Signed and Sealed this
Twentieth Day of July, 2021

Drew Hirshfeld
*Performing the Functions and Duties of the*
*Under Secretary of Commerce for Intellectual Property and*
*Director of the United States Patent and Trademark Office*